United States Patent
Chen

(10) Patent No.: US 7,356,753 B2
(45) Date of Patent: Apr. 8, 2008

(54) METHOD AND APPARATUS FOR ERROR CODE CORRECTION

(75) Inventor: Jonathan Chen, Taipei (TW)

(73) Assignee: Tian Holdings, LLC, Wilmington, DE (US)

( * ) Notice: Subject to any disclaimer, the term of this patent is extended or adjusted under 35 U.S.C. 154(b) by 489 days.

(21) Appl. No.: 10/961,933

(22) Filed: Oct. 8, 2004

(65) Prior Publication Data

US 2005/0081132 A1   Apr. 14, 2005

Related U.S. Application Data

(60) Provisional application No. 60/509,732, filed on Oct. 8, 2003.

(51) Int. Cl.
*H03M 13/00* (2006.01)

(52) U.S. Cl. .................................................. 714/755

(58) Field of Classification Search ......... 714/755–756
See application file for complete search history.

(56) References Cited

U.S. PATENT DOCUMENTS 5,991,911 A    11/1999   Zook 6,490,236 B1    12/2002   Fukuda et al.
6,738,943 B1 *   5/2004   Jen .............................. 714/756

FOREIGN PATENT DOCUMENTS

| CN | 1354467 | 6/2002 |
|---|---|---|
| JP | 09-265730 | 10/1997 |

\* cited by examiner

*Primary Examiner*—Shelly Chase
(74) *Attorney, Agent, or Firm*—Perkins Coie LLP

(57) ABSTRACT

A method and apparatus for ECC (error code correction) adopts a first directional first decoding, a first directional second decoding with a greater error tolerant ability than the first directional first decoding, a second directional first decoding, and a second directional second decoding with a greater error tolerant ability than the second directional first decoding. The ECC method includes steps of: read to be decoded; if there exists at least one solution cannot be efficiently solved after continuous executing the first directional first decoding and the second directional second decoding, execute the decoding action according to a predetermined flow control rule; if there exists no correction performed during the ECC decoding and switch to the other directional decoding, the un-modified value is added by one; and if the un-modified value reached a maximum un-modified value, an ECC failure is confirmed and then stop the ECC decoding.

16 Claims, 14 Drawing Sheets

METHOD AND APPARATUS FOR ERROR CODE CORRECTION

CROSS REFERENCE TO RELATED PATENT APPLICATION

This patent application claims the benefit of U.S. provisional patent application No. 60/509,732, filed Oct. 8, 2003.

FIELD OF THE INVENTION

The present invention is related to a flow control method of decoding and an error control apparatus, especially to a method and apparatus of error code correction applied to an optical disc driver for controlling decoding flow control and error code correction.

BACKGROUND OF THE INVENTION

Please refer to FIG. 1 which describes the flow of recording data to a Digital Versatile Disc (DVD). General, a DVD 60 can record various types of digital information 10, such as video, audio, data and other analog data that has been converted to corresponding digital data via some digital to analogue (A/D) conversion. As illustrated by FIG. 1, digital data 10 need to go through data compression 20, data security 30, error correction 40 and modulation/demodulation 50 in order to have data written in or data retrieve from the disc.

In greater details, when recording digital data 10 to DVD 60, digital data 10 must go through source code encoder 22, data encryption 32, error correction encoding 42 and modulation 52. Most of the error control encoding uses the Reed-Solomon Product Code (RSPC). Modulation 52 involves performing the Eight-Fourteen Modulation (EMF)

On the other hand, when reading the content stored in the DVD, the content must go through demodulation 54, error correction decoding 44, data decryption 34 and data decoding 24. EFM is used to perform demodulation 54. The error control decoder uses RSPC to decode.

Please refer to FIG. 2(a). FIG. 2(a) illustrates the information field of DVD. DVD information format is made of sectors; each sector is 2064 byte in size. Each information field 70 has 16 sectors, thus as shown in FIG. 2(a), an information field 70 is 172 byte by 192 byte.

Now please look at FIG. 2(b) which illustrates an ECC block. During error correction encoding 42, the outer parity code field 80 of 172 bytes by 16 bytes is added to information field 70. Next, a piece of inner parity code 90 of 10 bytes by 208 bytes is inserted between information field 70 and outer parity code 80. This brings the size of ECC block 100 to 182 bytes by 208 bytes. After EFM modulation, the ECC block can then be recorded to DVD.

Similarly, data read from DVD needs to be demodulated before they could be written into memory in 182 byte by 208 byte chunks and error corrected and decoded.

During error control decoding, the PI in each row is used to detect and correct errors occurred in certain bytes within the same row. For an example, bits $B_{0,172} \sim B_{0,181}$, PI of the row zero of information field 70 is used to correct N bytes of error between $B_{0,0}$ to $B_{0,171}$. If greater than N bytes of error occurred, these errors will not be able to be correct. In this example, when mark erasure is used, 10 bytes of errors can be corrected. When mark erasure is not used, a maximum of 5 bytes can be corrected. The use of PI to perform error correction is known as the PI procedure.

Furthermore, PO could be used to detect and correct certain number bytes of error within the same column. For an example, $B_{192,0} \sim B_{207,0}$ could be used to correct M bytes of error between $B_{0,0}$ and $B_{191,0}$. When the number of errors exceeds M between $B_{0,0}$ and $B_{191,0}$, they cannot be corrected. In theory, when mark erasure is used, a maximum number of 16 bytes of error could be corrected as oppose to 8 bytes when mark erasure is not used. The procedure of using PO to do correction is known as the PO procedure Please now turn to FIG. 3. The illustration depicts an error control decoder device used in prior art DVD devices. The device consists of a data buffer 306 for storing error correction code blocks read from the disk; an error control decoder 310 which further consists an ECC decoder flow controller 312 for controlling the ECC procedure; an ECC engine 314 consisting of a plurality of decoding modules that operate in the manner as a finite state machine in order to decode information with various decoding methods which usually contain at least one PI procedure and at least one PO procedure; an EDC engine 316 for checking errors of target error correction block. The ECC decoder flow controller 312, ECC engine 314 and EDC engine 316 could be implemented with logic circuit or microprocessor microcode. In order to communicate the principal of the present invention, storage medium (such as optical disc, hard disc, and etc.) shown in illustrations and control unit within the storage device are shown as one element called storage medium and control unit 304. The storage medium and control unit 304 exchanges data with host 300 via bus 302.

In prior practice, storage medium and control unit 304 sends not-yet-decoded ECC block to data buffer 306 via bus 302 at the beginning of a decoding session. This block of data sent becomes the "target" ECC block. Next, ECC decoder flow controller 312 initializes and selects either a PI procedure or a PO procedure within the ECC engine 314 and proceeds with decoding. If a PI procedure is selected, EDC engine 316 determines if the block of data passes error correct and terminates the error code control decoder process. Failure in passing the error correct test implies that errors within the target ECC block could not be corrected by the PI procedure. ECC decoder flow controller 312 then check if retry count has met the maximum value; before the retry value reaches the maximum value, ECC decoder flow controller 312 will increment the retry value and proceed with PO procedure.

At the completion of PO procedure, EDC engine 316 performs error detection on the target ECC block. Passing the error detection means data within the target ECC block are correct. This means the target ECC block has had all error corrected and the error code control decoder has completed its task. However if the target ECC block does not pass error detection, it means there are some errors within the block that cannot be correct with PO procedure. ECC decoder flow controller 312 then check if retry value has met the maximum value; before the retry value reaches the maximum value, ECC decoder flow controller 312 will increment the retry value and proceed with PI procedure. Once the retry value reaches the maximum value, the ECC decoder flow controller 312 will declare an ECC failure since repeating PO and PI procedures were not able to completely correct errors.

Please refer to FIG. 4(a) which depicts the flow of determining failure in prior art. Decoding procedure is initialized before an ECC decoder flow controller 312 can select PI or PO procedure within the error code correction process. As mentioned above, the error code correction process contains at least one PI procedure and at least one PO procedure. Hypothetically, the error detection determines if the ECC block passes error detection procedure 104 after a PI process 102, the information in the block is assumed to be all correct and thus the error correction 114 has been completed and the whole error code control decoding procedure has been completed. Whereas if the ECC block did not pass the error detection test, this implies there are some errors that could not be corrected with PI procedure. Then the retry value is checked (106), if the retry value has not reached the limit, retry value is incremented (107) and PO procedure 108 is carried out.

After PO procedure 108, the error detection coded decoder procedure determines whether the ECC block has passed error detection 110. Passing error detection test 110 means that data in the information sector is correct and has passed error correction 114. Therefore the error detection control decoder procedure could be terminated. On the other hand, if the ECC block did not pass the error detection test, there are some errors the PO procedure could not fix. Then, before the retry value reaches limit (112), retry value is incremented by 1 (113) and PI procedure 102 is carried out. In the case of retry value has reached maximum and the PI and PO procedure did not complete error control decoder procedure, the ECC process has failed (116).

In the previously error control decoding procedures, ECC failure is determined by whether the retry value has reached a certain limit. In some circumstances, for example when (N+1) byte * (M+1) byte of data within the information filed are erroneous, then no matter how many times the device re-attempts to perform error correction, the error control decoding procedure can not be completed. When ECC failure occurs, the target ECC block goes repeating steps 102, 104, 106, 107, 108, 110, 112 and 113 until the retry value reaches limit before reaching ECC failure (116). Thus, a failed error correction could not be identified before the retry value reaches limit. This mechanism could possibly waste system resources by repeating unnecessary PO and PI procedure.

The use of mark erasure provides a better tolerance to errors. Please now turn to FIG. 4(b) which illustrates another known procedure for determining ECC failure. The most significant difference between this drawing and FIG. 4(a) is that the PO and PI procedure in this illustration each have two different approaches. This example has;
1. mark erasure PO procedure 401,
2. mark erasure PI procedure 402,
3. PO procedure without mark erasure 403, and
4. PI procedure without mark erasure 404.

When a decode failure occurs, the row and column number (YNUM) where failure occurred is noted. When 0< YNUM≦ ERA_max (ER_max is 10 in PI procedure and 16 in PO procedure), another round of mark erasure procedure will be necessary. In this example, when PI procedure 404 results in decode failure, the position is marked and then, (1) mark erasure PO procedure 401 is executed. However, if YNUM is greater than ERA_max (ERA_max in PI procedure is 10 and in PO procedure is 16), another round of decoding procedure without mark erasure should be carried out, which would be (3) PO procedure without mark erasure 403 in the above list.

When continuous (4) PI procedure without mark erasure 404 and (1) mark erasure PO procedure 401 does not decode all data, the relationship between YNUM and ERA_max are examined again. When 0< YNUM ERA_max (2) mark erasure PI procedure 402 will be performed. On the other hand, if YNUM> ERA_max then (4) PI procedure without mark erasure 404 would be carried out. Furthermore, if continuous (3) PO procedure without mark erasure 403 and (2) mark erasure PI procedure 402 does not lead to decoding all data, YNUM and ERA_max is compared again to enter into (1) mark erasure PO procedure 401 when 0< YNUM ERA≦ ERA_max) or (3) PO procedure without mark erasure 403 if YNUM>ERA_max.

When the ECC block passes error detection after a certain procedure, the data within target ECC block are correct. In other words, the error correction is completed. This means the error control decoding procedure is completed and following procedures are ready to be commenced. Note that this is not illustrated in the drawing. The main disadvantage of the above described flow control is the possibility of missing some opportunities of successfully decoding all data. Please refer to FIG. 5, which is an example of an ECC block with decode failure bytes. Decode failure bytes are marked with "*". Suppose this ECC block goes through the procedure illustrate by FIG. 4(b), it will, for example, first go through (4) PI procedure without mark erasure 404. When the number of decode failure on a particular row is greater than 5 and smaller than 10, YNUM comes into the picture and helps decide which procedure is to be used next. In this example, YNUM is 8, so 0< YNUM≦ERA_max (ERA_max in PI procedure is 10 and ERA_max in PO is 16) and a round of mark erasure procedure is carried out. In this particular example, decode failure byte after executing PI procedure 404 is marked before ECC block is applied with (1) mark erasure PO procedure 401. Nevertheless, the decode failure row number is very close to the upper limit and there are some data yet to be tested for decode error. The end result is an unsuccessful decoding. This mechanism performs in such a manner that an appropriate PI procedure without mark erasure step 404 will not come into the decoding flow, causing the decoding process to repeat ineffectively. The purpose of the present invention improves on the above mention flaws of prior art.

The invention provides a method and apparatus of an error correction for detecting and correcting an error in an ECC (error correction code) block read from a storage medium, said ECC block including a PI (parity of inner-code) block and a PO (parity outer-code) block. The storage medium can be a DVD optical disc or CD-RW optical disc etc.

An aspect of the invention provide method comprises executing a first directional ECC decoding and a second directional ECC decoding iteratively if a retry count of one of said first directional ECC decoding and said second directional ECC decoding being less than a first threshold count, otherwise regarding as an ECC failure. The method comprises executing the first directional ECC decoding and the second directional ECC decoding iteratively if an un-modified count of one of said first ECC decoding and said second ECC decoding being less than a second threshold count, otherwise regarding as an ECC failure.

The first directional ECC decoding comprises a PI decoding and the second directional ECC decoding comprises a PO decoding. And the first directional ECC decoding and the second directional ECC decoding can further comprises a random error process.

The error correction method further comprises a step of executing an auxiliary PO decoding with marking erasure process followed after the PO decoding if a decode error or an un-correctable error read from the storage medium is detected.

The error correction method further comprises a step of executing an auxiliary PI decoding with a marking erasure process followed after the PI decoding if a decode error or an un-correctable error read from the storage medium is detected.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 6:
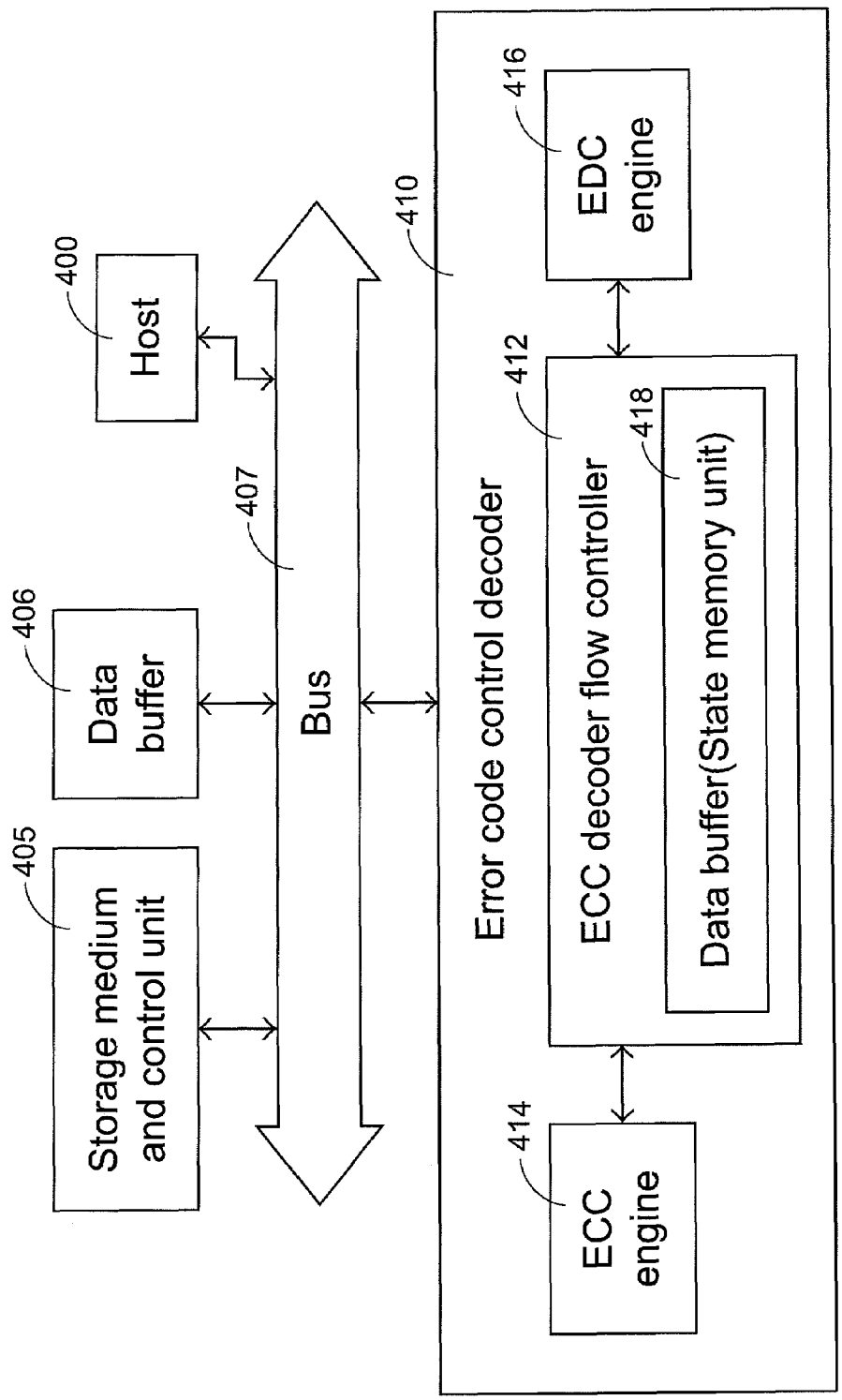
FIG. 6 is the block diagram illustrating the present invention—an error control code decoder.

Please refer to FIG. 6. FIG. 6 is the present invention —an error control code decoder within a storage device, which contains a data buffer 406, used to temporarily store error correction code block from an optical disk for later decoding processes; an error code control decoder 410, which contains an ECC decoder flow controller 412 for controlling the error control decoding flow; an ECC engine 414 which may consist of a plurality of modules of different decoding process and controlled by a finite state machine to decode codes that are encoded with a mixture of different encoding methods. Furthermore, the ECC engine 414 contains at least one PI procedure and at least one PO procedure. The present invention shall be discussed below following the example of an ECC engine having at least one PI procedure and at least one PO procedure for the purpose of explaining the principal of the invention. However it must be noted the present invention is not limited to an ECC engine with only one PI procedure and one PO procedure. The error control decoder device further comprises an EDC engine 416 for checking errors of target ECC block. The ECC decoder flow controller 412 the ECC engine 414 the EDC engine 416 could be implemented with logic circuits or microprocessor microcode functions. In order to communicate the principal of the present invention, storage medium (such as optical disc, hard disc, and etc) shown in illustrations and control unit within the storage device are shown as one element called storage medium and control unit 405. The storage medium and control unit 405 exchanges data with host 400 via bus 407. In addition to ECC decoder flow controller 412, which checks the retry value, the present invention has an additional state memory unit 418 which records execution outcome of the ECC engine 414 and the EDC engine 416. The addition of such a state memory unit 418 helps speed up spotting an ECC failure. In one embodiment, the purpose of the state memory unit 418 is for storing an "un-modified" value.

At the initialization of a decoding process, storage medium and control unit 405 sends not-yet-decoded ECC block to data buffer 406 via bus 407 at the beginning of a decoding session. This block of data sent becomes the "target" ECC block. Next, ECC decoder flow controller 412 initializes and selects either a PI procedure or a PO procedure within the ECC engine 414 and proceeds with decoding. At this time, ECC decoder flow controller 412 will record the status of ECC engine 414 in the state memory unit 418. In the present embodiment, this action means setting the un-modified value to 0.

At the completion of PI procedure, EDC engine 416 determines if the block of data passes error correction test and terminates the error code control decoder process. Passing the error correct test implies that errors within the target ECC block have been successfully corrected and the error code control decoding process has completed. However, if the ECC block does not pass the error correction test carried out by the EDC engine 416, it means there are errors that can not be corrected by PI procedure. The ECC decoder flow controller 412 records the result in the state memory unit 418. In the present embodiment, this action will involve first checking if the target ECC block has been modified and if so, reset the un-modified value to 0; if not, increment the un-modified value by 1. Additionally, the ECC decoder flow controller 412 then checks if retry value has met the maximum value; before the retry value reaches the maximum value, ECC decoder flow controller 412 will increment the retry value and proceed with PO procedure.

At the completion of PO procedure, EDC engine 416 performs error detection test on the target ECC block. Passing the error detection means data within the target ECC block are correct. This means the target ECC block has had all error corrected and the error code control decoder has completed its task. However if the target ECC block does not pass error detection, it means there are some errors within the block that cannot be corrected with PO procedure. The ECC decoder flow controller 412 records the result in the state memory unit 418. In the present embodiment, this action will involve first checking if the target ECC block has been modified and if so, reset the un-modified value to 0; if not, increment the un-modified value by 1. ECC decoder flow controller 412 then checks if retry value has met the maximum value; before the retry value reaches the maximum value, ECC decoder flow controller 412 will increment the retry value and proceed with PI procedure. Once the retry value reaches the maximum value, the ECC decoder flow controller 412 will declare an ECC failure since repeating PO and PI procedures were not able to completely correct errors.

One aspect of the present invention emphasis that the ECC decoder flow controller 412, in addition to monitoring the retry value, also checks the state memory unit 418 to speed up the identification of an ECC failure. When ECC decoder flow controller 412 observes that the state memory unit 418 indicates target ECC block has been through one round of PO and PI procedure through the ECC engine 414 and no modifications has been made to the target ECC block, the ECC decoder flow controller 412 can quickly declare an ECC failure. In the present embodiment, the decision by ECC decoder flow controller 412 is determined by whether the un-modified value has reached a preset un-modified value limit. The un-modified value reflects the number of times ECC engine 414 has repeated error correction. For example, if ECC engine 414 offers only two types of processes PI procedure and PO procedure, then an appropriate un-modified value would be 2. Once the un-modified value reaches 2 in the present embodiment, the ECC engine 414 would have executed one round of both procedure and has not been able to make any correction on the target ECC block.

Figure 4A:
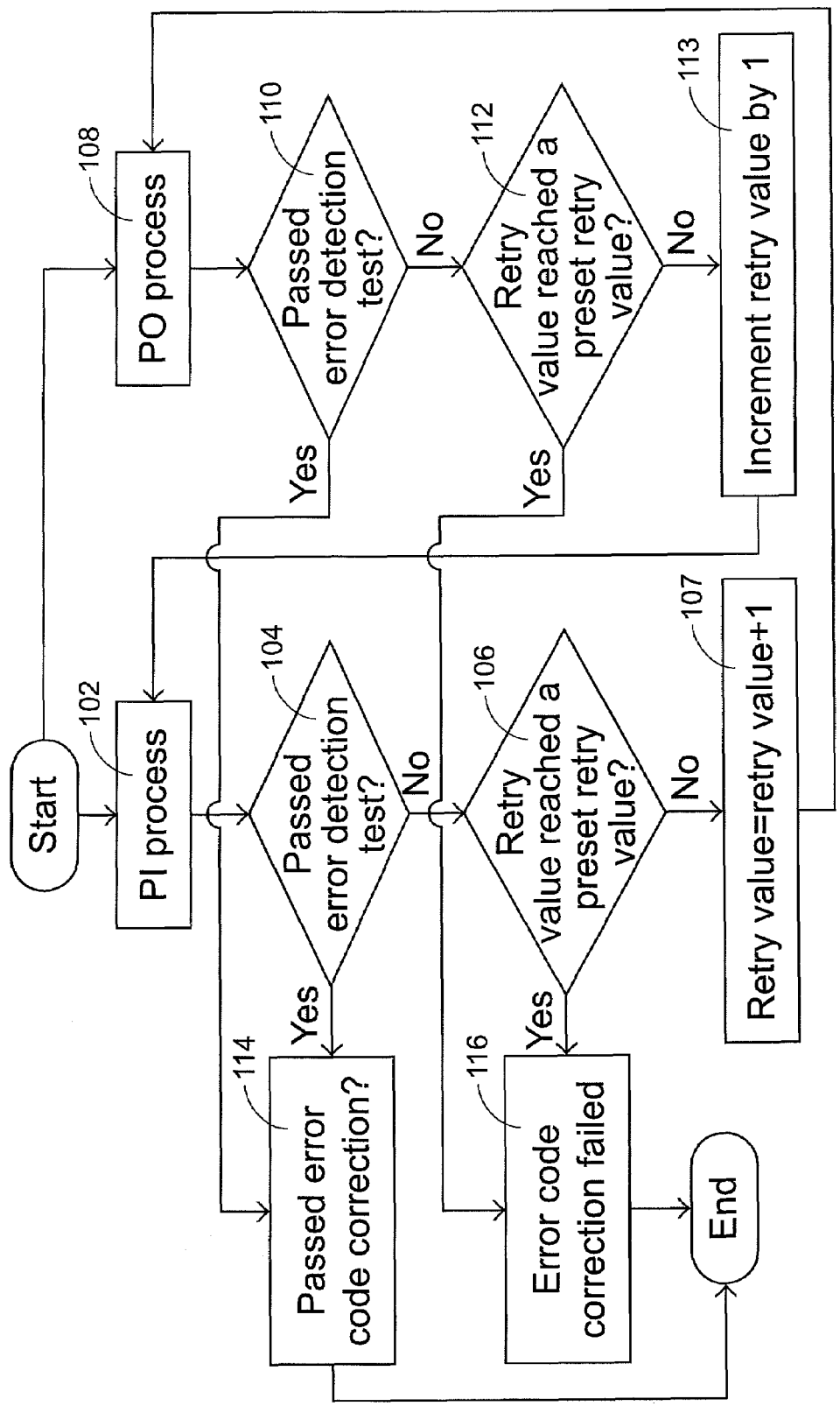
FIG. 4(a)-(b) illustrate the decision step taken by prior art in determining a decoding failure.
Figure 7A:
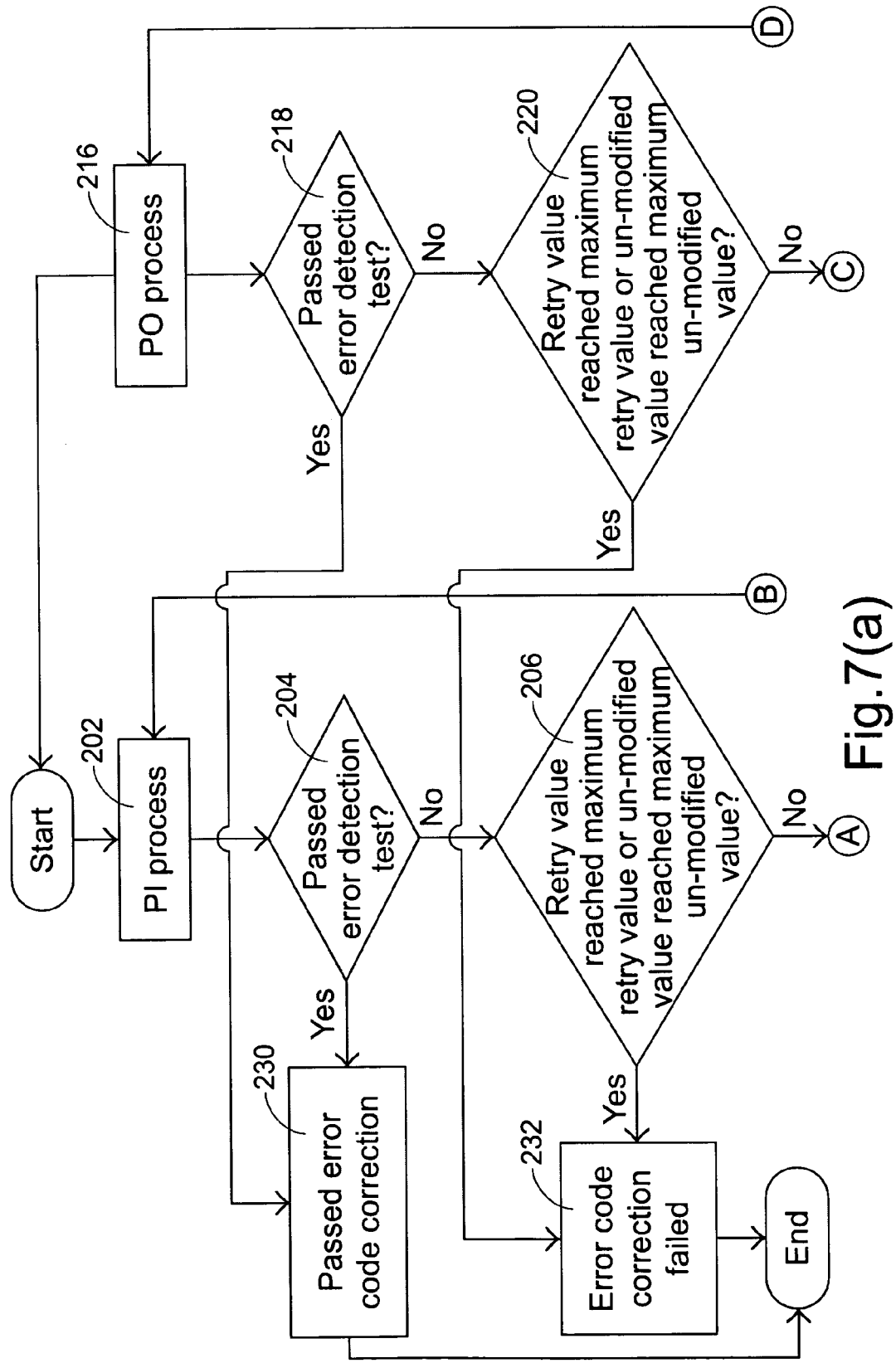
FIG. 7(a)-(b) show the logic flow of a better embodiment of the present invention to determine failure.
Figure 7B:
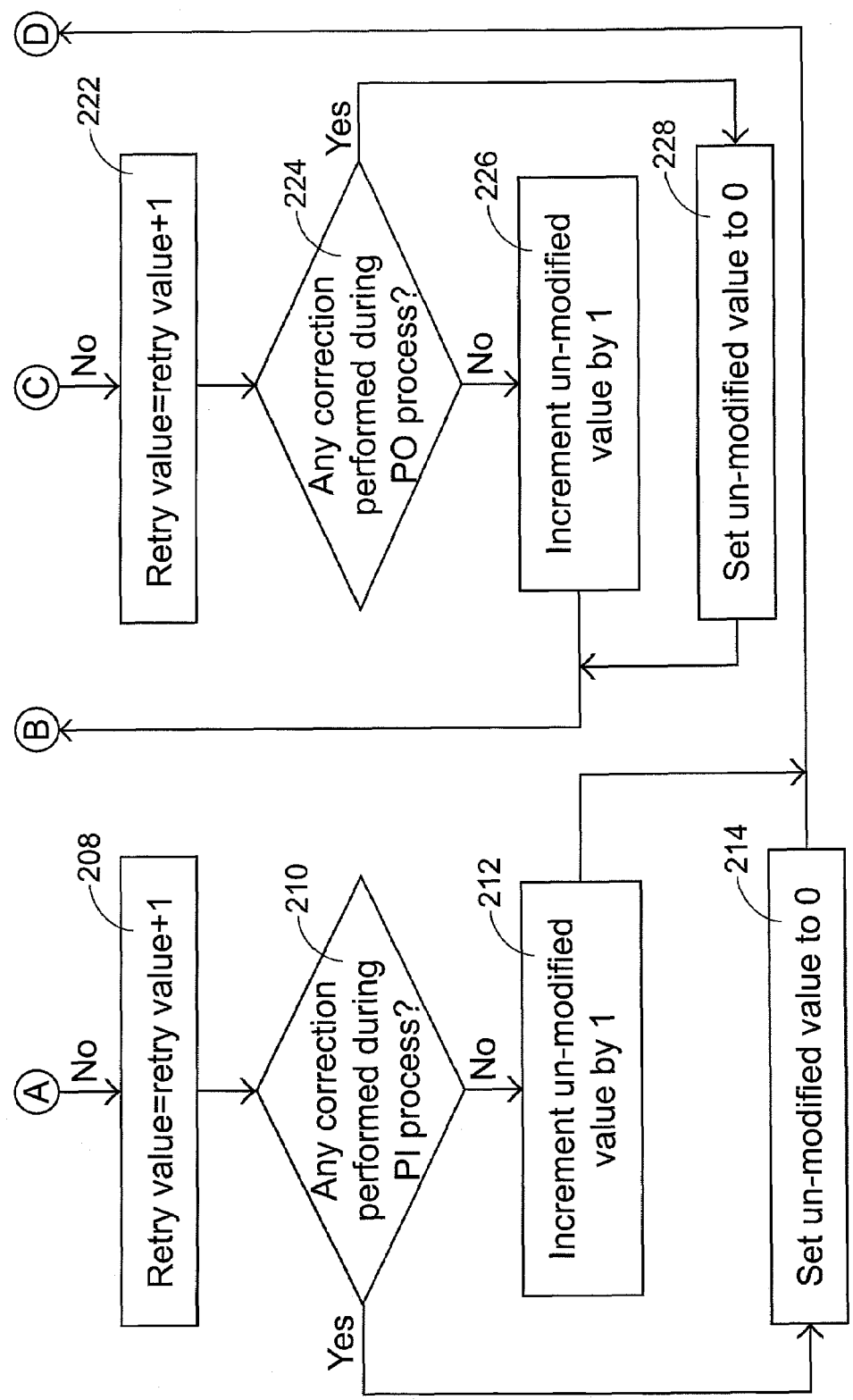

Please refer to FIG. 7, showing a failure judgment method in the error code correction process of the present invention, in order to overcome the disadvantages as shown in FIG. 4(a) of the prior art. Except the concept of retry count, the present invention further adds an un-modified count to speed up the judgment for an ECC failure In the beginning of the flow in FIG. 7, one can select one of PI process 202 and PO process 216 as the first step in this embodiment. As described above, the ECC process which at least includes a PI process and a PO process (or further divided into four processes including PI process with marking erasure PI process, PO process with marking erasure and PO process). For the purpose of simplification, we provide an example which only includes a PI process 202 and a PO process 216, but the present invention is not limited to this specific example. Assume after executing the PI process (step 202), the step 204 judges whether the EDC (error detect code) process is OK or not. If the answer is yes, it means the data in the information region (ECC block) are connect. That also means the ECC (error connect code) process (step 230) is passed, therefore the ECC decoding process can be terminated. In contrast, if the EDC process is not passed, it means there exists at least one error in the information region (ECC block) and the error cannot be corrected by the PI process 202. After that, the present invention judges whether the retry value reached a maximum retry value or not. It judges whether the un-modified value reached a maximum un-modified value or not at step 206. If the answer is NO, the retry value is added by 1 at step 208.

The step 210 seeks to judge whether any correction was performed during the PI process 202. Said "correction" means that an action of read modify write had been executed for at least one Byte of memory in the ECC block. If there exists at least one correction performed during the step 210, then the un-modified value is set to be zero at step 214. In contrast, if there exists no correction performed during the step 210, the un-modified value is added by one at step 212.

After executing the PO process (step 216), the step 218 makes a judgment whether the EDC (error detect code) process is OK or not. If the answer is yes, it means the data in the information region (ECC block) are connect. That also means the ECC (error correct code) process (step 230) is passed, therefore the ECC decoding process can be terminated. In contrast, if the EDC process is not passed, it means there exists at least one error in the information region (ECC block) and the error cannot be corrected by the PO process 216. After that, the present invention judges whether the retry value reached a maximum retry value or not. It judges whether the un-modified value reached a maximum un-modified value or not at step 220. If the answer is NO, the retry value is added by 1 at step 222. In contrast, if the answer is YES, the ECC error can be determined at step 232.

The step 224 judges whether any correction was performed during the PO process 216. Said "correction" means that an action of read modify write had been executed for at least one Byte of memory in the ECC block. If there exists at least one correction performed during the step 224, then the un-modified value is set to be zero at step 228. In contrast, if there exists no correction performed during the step 224, the un-modified value is added by one at step 226. Then the PI procedure at step 202 is processed.

An un-modified value is added to the present invention for speeding up an ECC failure judgment in the ECC decoding. Therefore, if there exist (N+1) Byte x (M+1) Byte errors in the information region (ECC block), there is not any correction generated by a PO process or a PI process. Thus, the un-modified value will increase continuously. That means we can make a quick judgment for the ECC failure. For example, we can set the maximum un-modified value to be 2, if there is not any Byte of memory of the ECC block to be corrected after executing one PI process and one PO process, and then the state of the ECC decoding can be regarded as an ECC failure. By the method described above, the present invention can improve the ECC decoding speed and prevent the waste of resource due to retrying of PO process and PI process continuously in order to decode the codeword successfully.

Figure 4B:
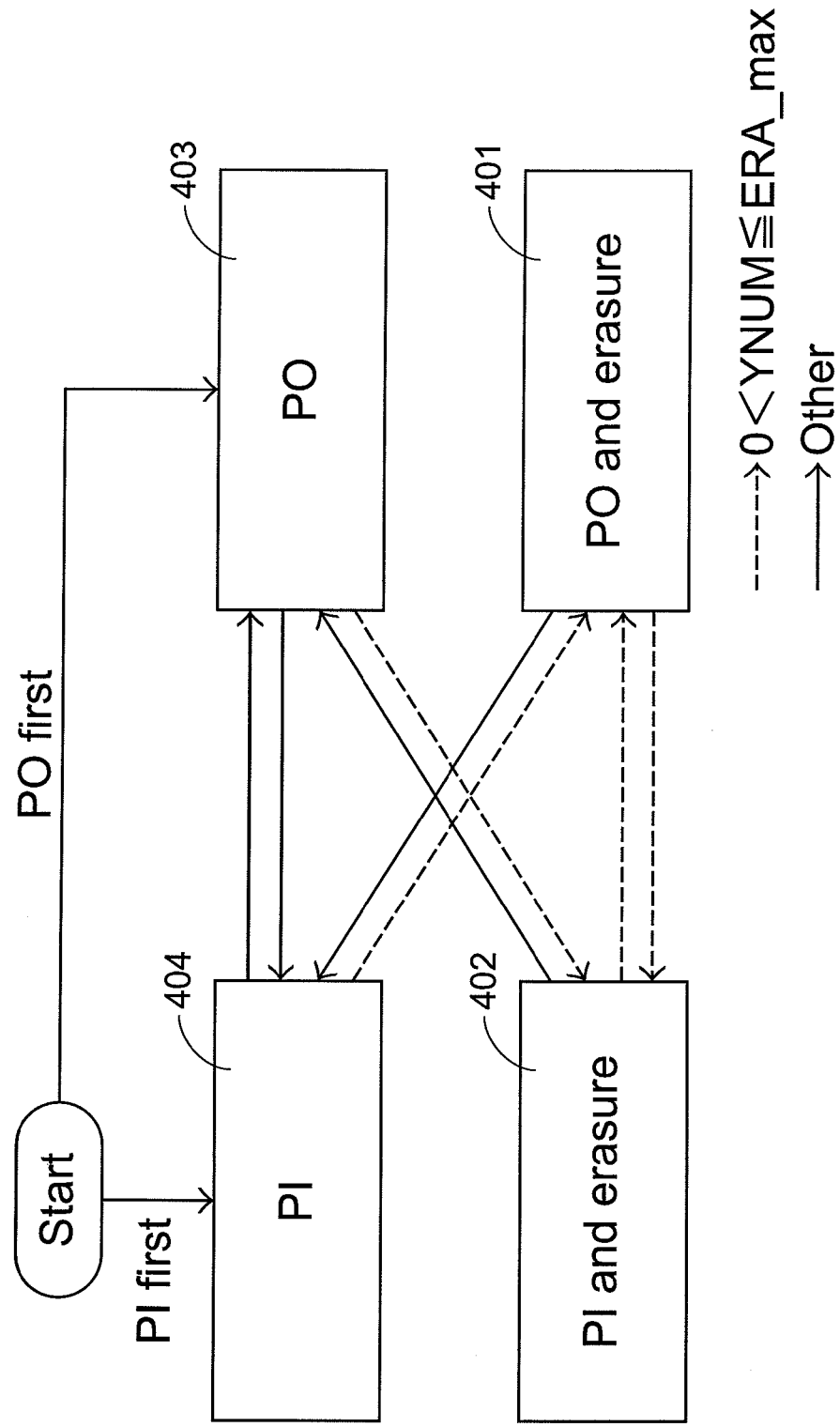
Figure 8:
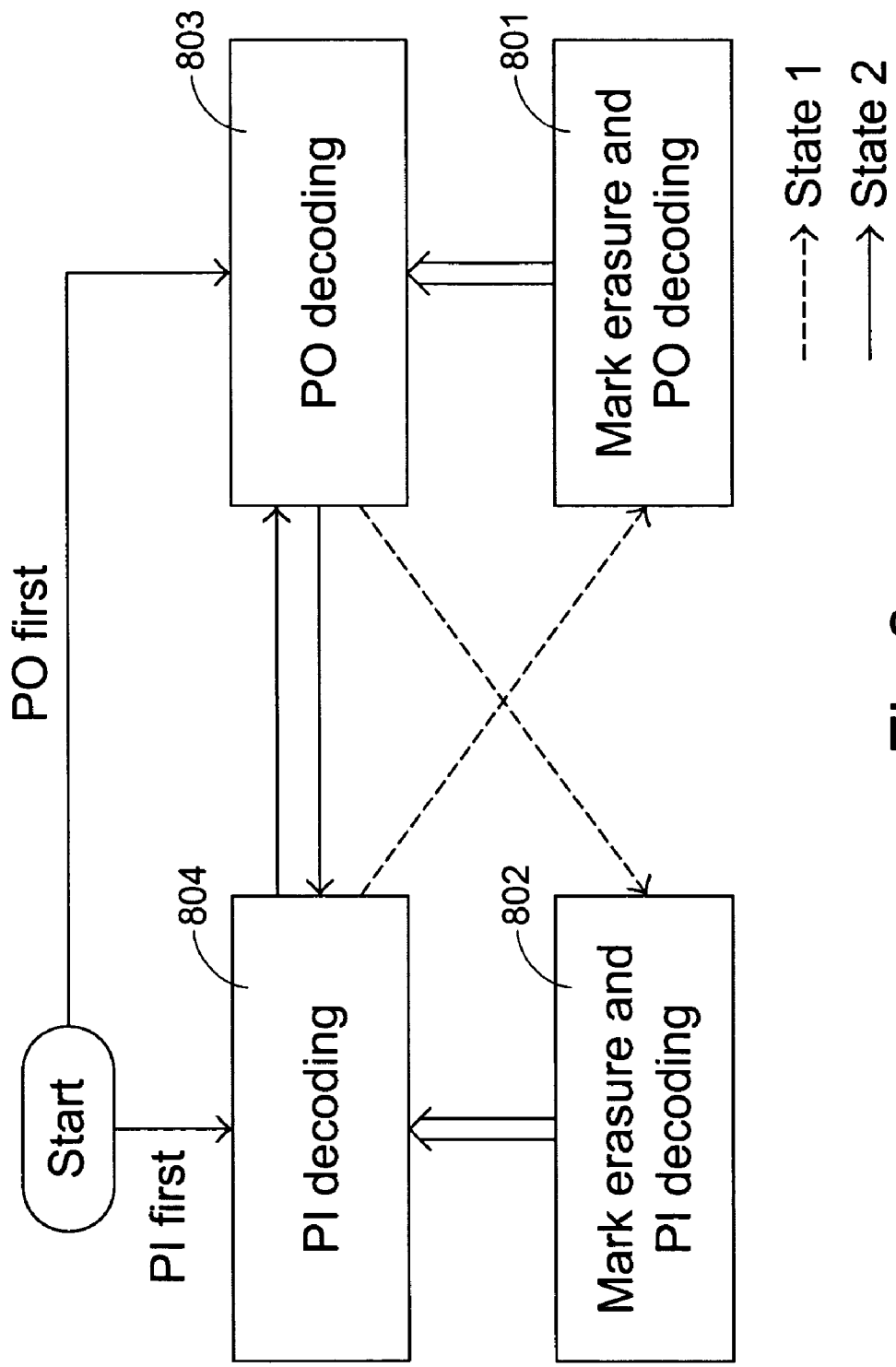
FIG. 8 shows the logic flow of another better embodiment of the present invention to determine failure.

In order to overcome the disadvantages in the prior art as shown in the FIG. 4(b), the present invention provides a preferred embodiment of ECC flow control method as shown in FIG. 8.

There are four kinds of ECC decoding in this embodiment as shown in the following:

1. step 801 PO process with marking erasure.
2. step 802 PI process with marking erasure.
3. step 803 PO process.
4. step 804 PI process.

At the beginning of the process flow as shown in FIG. 8, one can properly select first step from PI process (step 804) and PO process (step 803) by a predetermined rule.

Assume that step 804 PI process is selected as the first step of this embodiment within the scope of the present invention, and if it cannot decode successfully, correct all the errors in the ECC clock, and generate a decode error, a judgment of path selection will be made according to decoding error line number/column number, and further judging which kind of PO process is suitable for this condition.

In this embodiment, path selection judgment can be judged from the following condition:

Condition 1:

State 1: $0 < YNUM \leq ERA\_max$ (ERA_max is set to be 10 in the PI process, and ERA_max is set to be 16 in the PO process);

State 2: $YNUM > ERA\_max$.

Condition 2:

State 1: $0 < YNUM \leq (ERA\_max)-1$ (ERA_max is set to be 10 in the PI process, and ERA_max is set to be 16 in the PO process);

State 2: $YNUM > (ERA\_max)-1$.

Condition 3:

State 1: $1 < YNUM \leq ERA\_max$ (ERA_max is set to be 10 in the PI process, and ERA_max is set to be 16 in the PO process);

State 2: $YNUM > ERA\_max-1$ or $YNUM = 1$.

Condition 4:

State 1: 1<YNUM≦(ERA_max)−1 (ERA_max is set to be 10 in the PI process, and ERA_max is set to be 16 in the PO process);

State 2: YNUM>(ERA_max)−1 or YNUM=1.

Wherein the purpose of the adaptive setting of upper bound of YNUM and the lower bound of ERA_max is to increase the error tolerance corresponding to the quality of different kinds of optical discs by a proper modification.

As shown in FIG. 4(b), if the result of the decoding error line number/column number corresponds to the state 1 after executing the PI process at step 404, then execute (1) PO process at step 401 with a erasure algorithm after marking the location of decode failure during the PI process. In contrast, if the resultant of decoding error line number/column number corresponds to the state 2 after executing PI process at step 404, then the present invention can judge this condition is suitable for another directional decoding process with no erasure algorithm. That means to execute (3) PO process at step 403.

One feature of the present invention is shown as the following by two cases:

(A) If there exists at least one solution that cannot be solved after continuous executing (4) PO process at step 404; and (1) PO process with erasure algorithm at step 401, then execute (3) PI process at step 403.

(B) If there exists at least one solution that cannot be solved after continuous executing (3) PO process at step 403, and (2) PI process with erasure algorithm at step 402, then execute (4) PI process at step 404.

Figure 5:
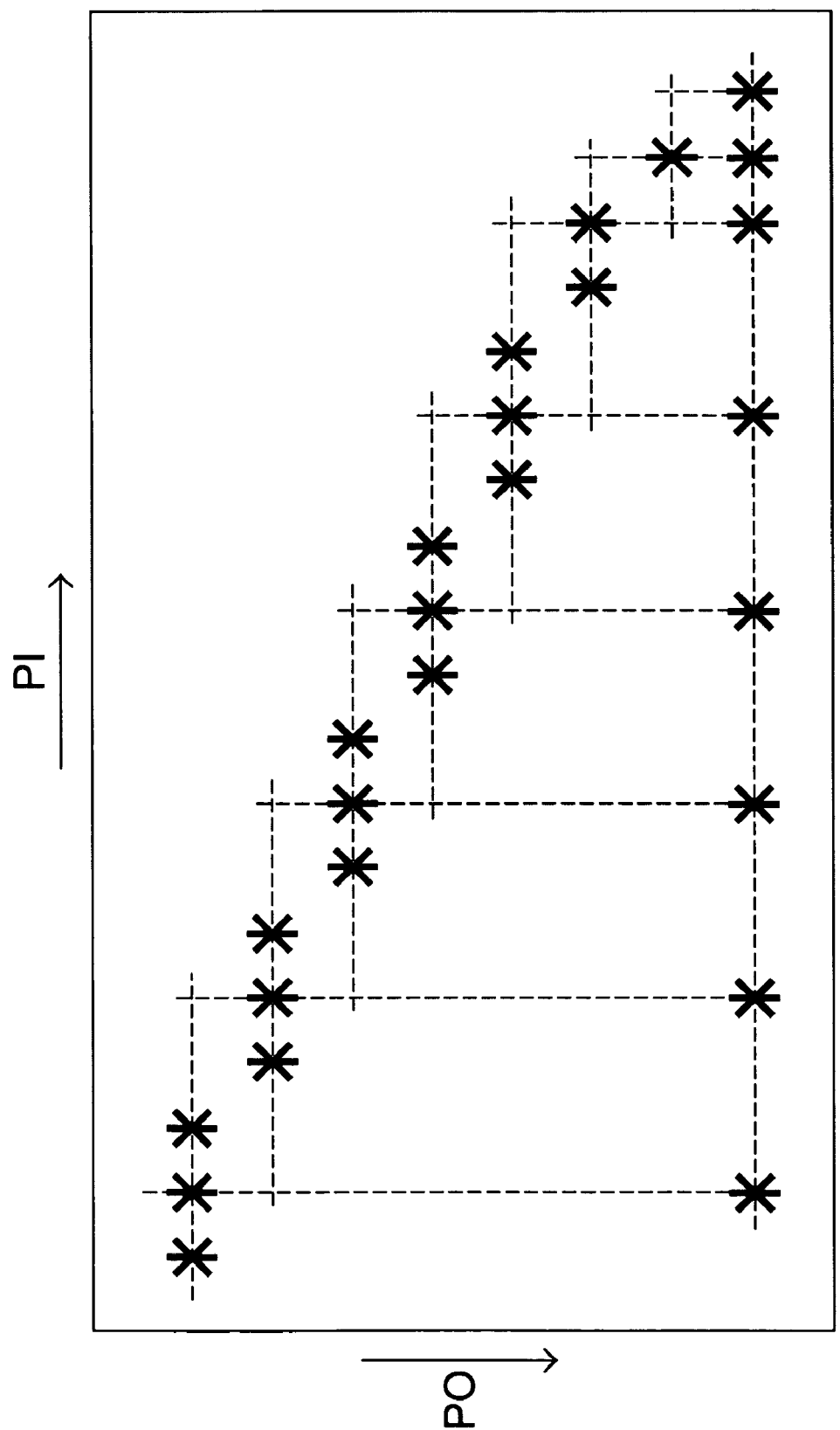
FIG. 5 shows an ECC block with some decode failure bytes.

By the method described above, if there exists an optical disc with a decode failure distribution as shown in FIG. 5, and although there exists at least one solution that cannot be efficiently solved after continuous executing (4) PI process at step 404, and (1) PO process with erasure algorithm at step 401, we still can decode it successfully by executing (3) PO process at step 403. (Because the bit number of decode error for each line didn't exceed 8.)

Therefore, another advantage of the present invention is the state judgment for changing a variable path and can decode some worse DVD optical disc, which cannot be decoded successfully by the conventional decoding method. Of course, the additional un-modified value added in the present invention can speed up the ECC failure judgment flow, and it also can be applied in FIG. 4(b) and FIG. 8. As such, the present invention is not limited to any particular embodiment described here, include RSPC (Reed-Solomon Product Code) related applications.

Figure 9:
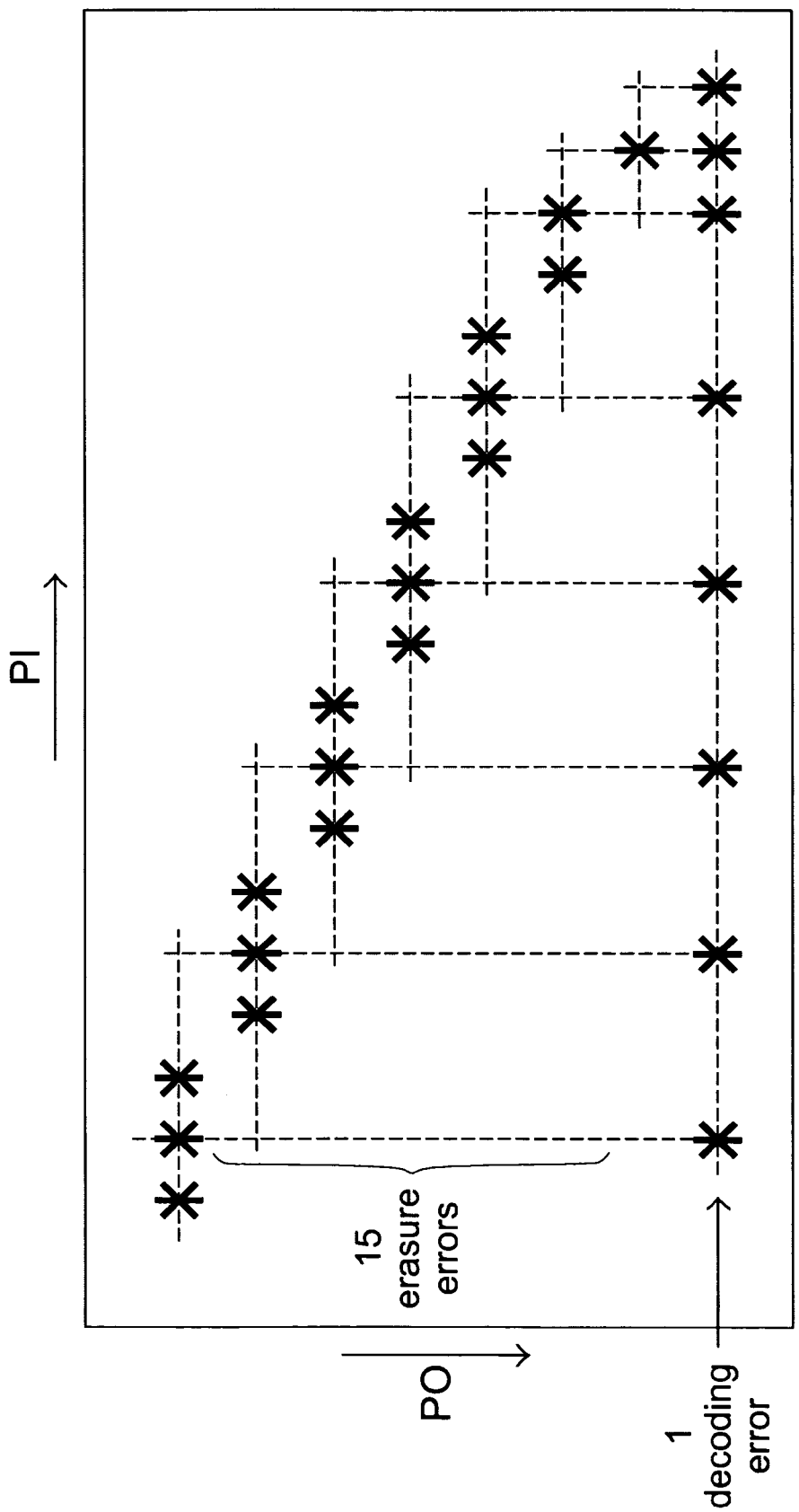
FIG. 9 shows an ECC block with 16 errors.
Figure 10:
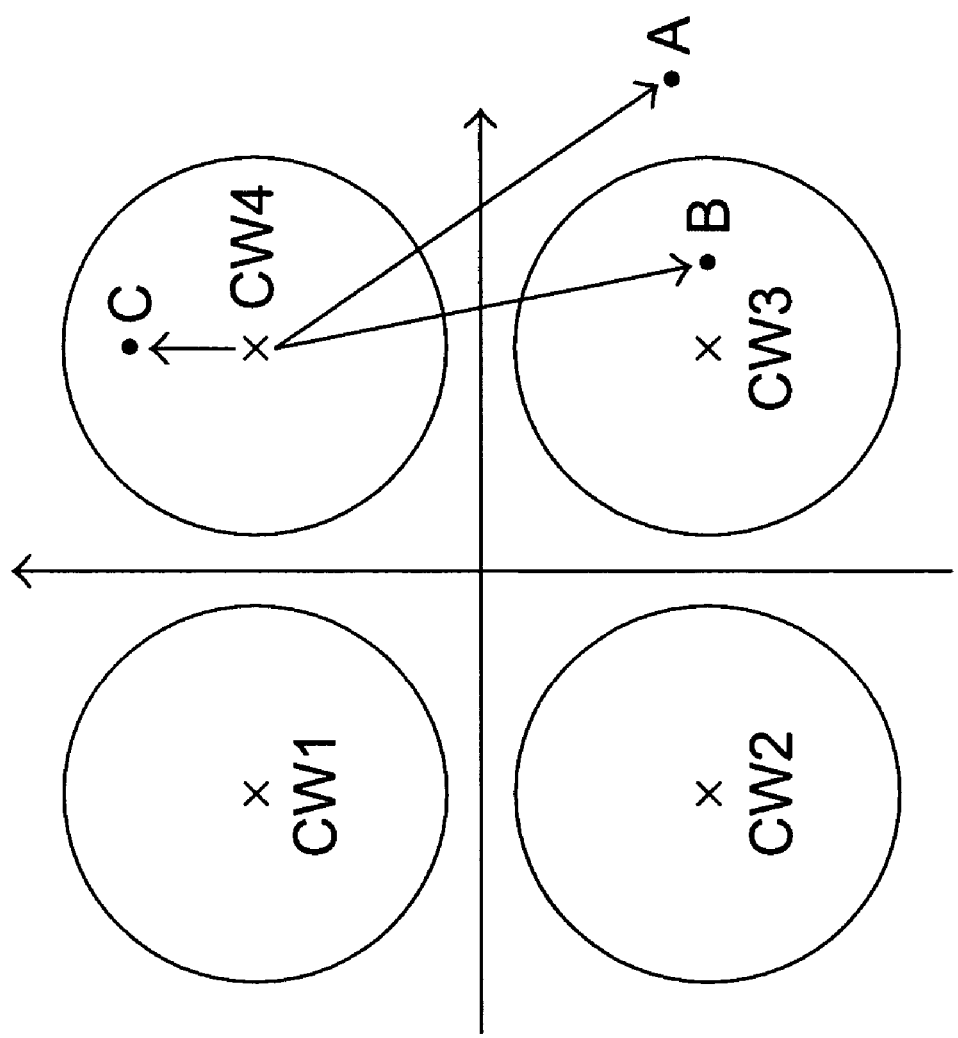
FIG. 10 shows an example to explain the concepts of correct and incorrect decoding.
Figure 11:
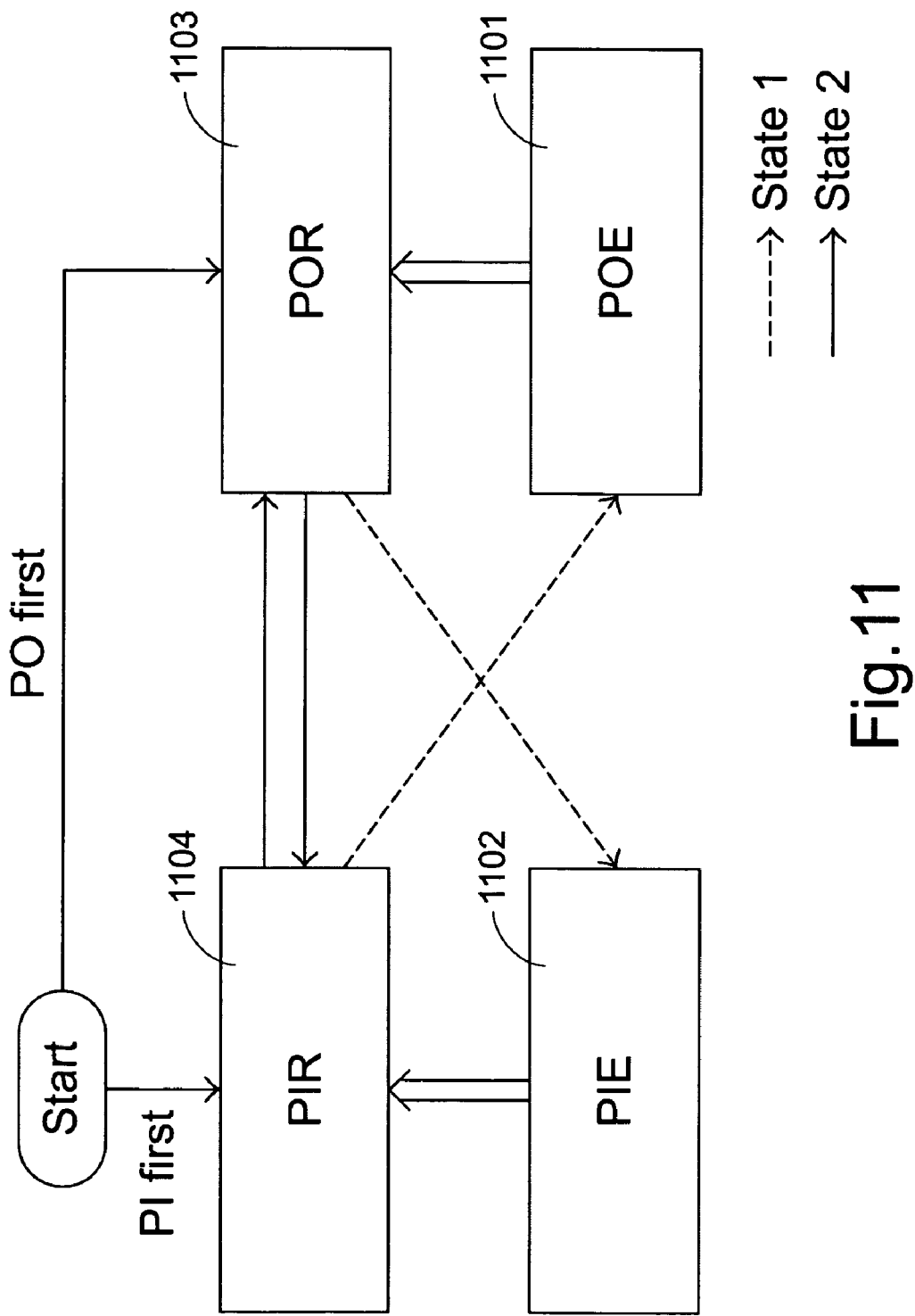
FIG. 11 shows the logic flow of another better embodiment of the present invention to execute an ECC process.

FIG. 9 shows an example of a decoding error read from a storage medium. As shown in FIG. 9, we assume Hamming distance dmin equals 16 and there exists fifteen erasure errors and one decode error. FIG. 10 shows a correct and two incorrect decodings. Wherein point A is a detectable error, point B is an un-detectable error and point C is a correct decoding. One can correct the errors shown in FIG. 9 provide that Equation (1) is valid.

$$2 \times v + f < dmin \qquad \text{Equation (1)}$$

Wherein v is random error number and f is the erasure number. According to Equation (1), 2×1+15=17>16=dmin. It means that the solution cannot be solved. Except that we make a POE processing (PO and mark erasure processing) or a PIE processing (PI and mark erasure processing) if there exists a decoding error, then according to FIG. 8 we can correct 16 errors as shown in FIG. 9. That means there are two possible procedures as shown in FIG. 11:

(1) PI first
  (i) 1104 PIR→1101 POE (for state 1)→1103 POR→etc.
  (ii) 1104 PIR→1103 POR (for state 2)→etc.

(2) PO first
  (i) 1103 POR→1102 PIE (for state 1)→1104 PIR→etc.
  (ii) 1103 POR→1104 PIR (for state 2)→etc.

PIR processing (PI processing with random error processing)

POR processing (PO processing with random error processing)

Thus we can find two continuous PO or two continuous PI procedures according to the present invention.

From the above description, the present invention can improve the rate of ECC decoding. Furthermore, when a conventional invention cannot decode a worse DVD optical disk if a decoding error occurred, we have a chance to correct the decoding error in the worse DVD optical disk by two consecutive PI or PO procedures with alternately open the function of marking erasure.

Figure 1:
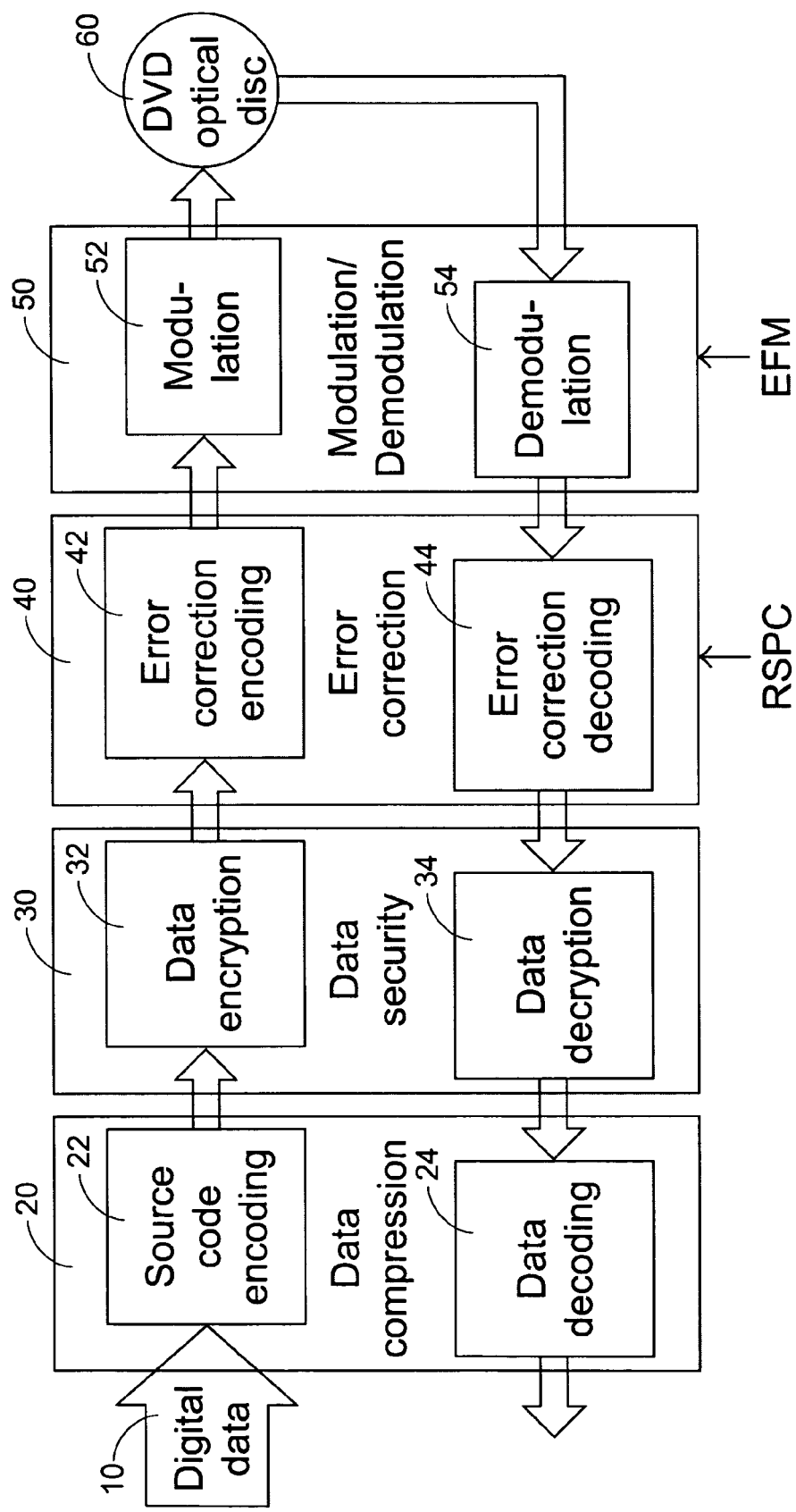
FIG. 1 describes the DVD data recording flow.
Figure 2A:
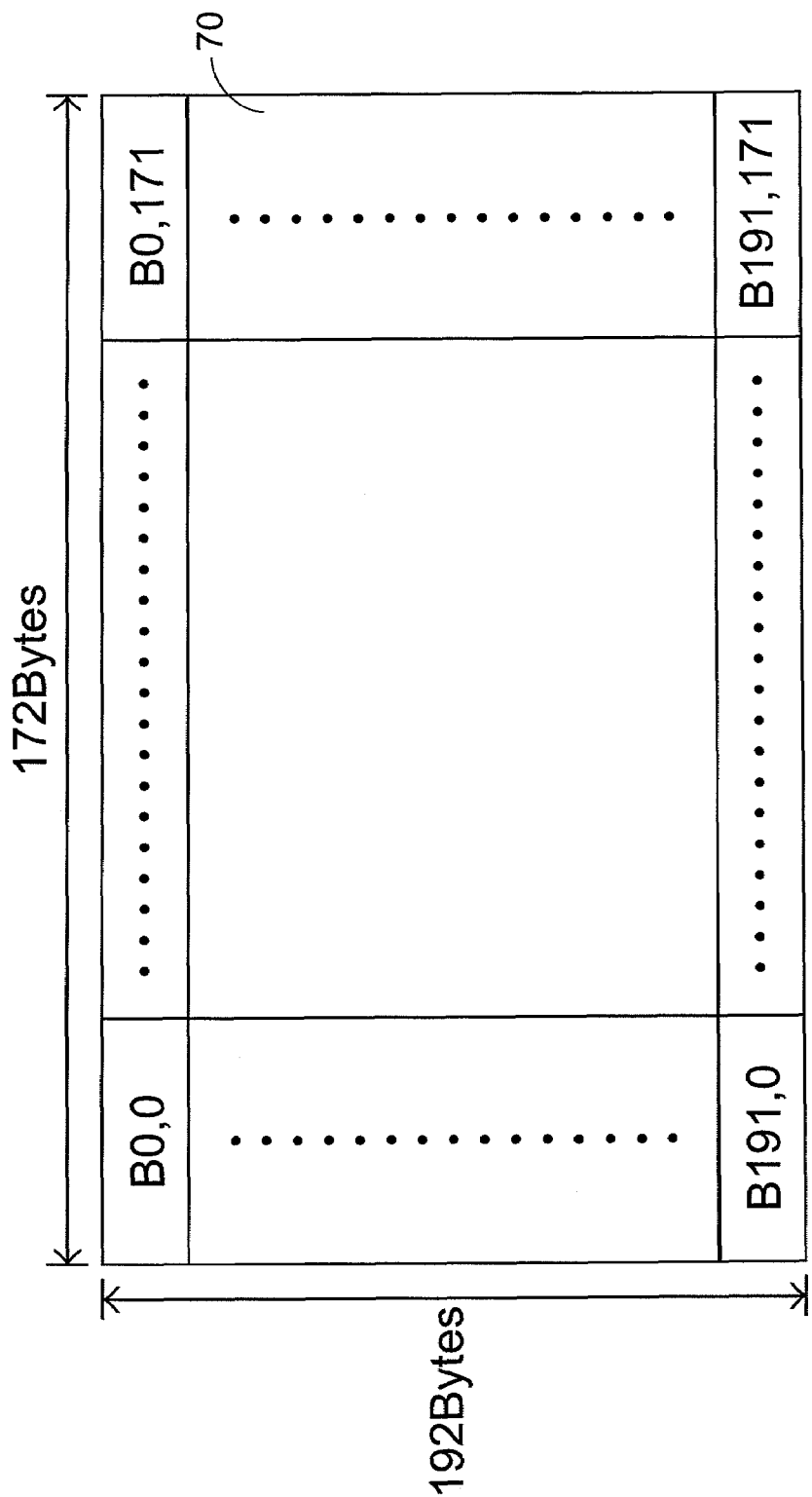
FIG. 2(a) illustrates an information field.
Figure 2B:
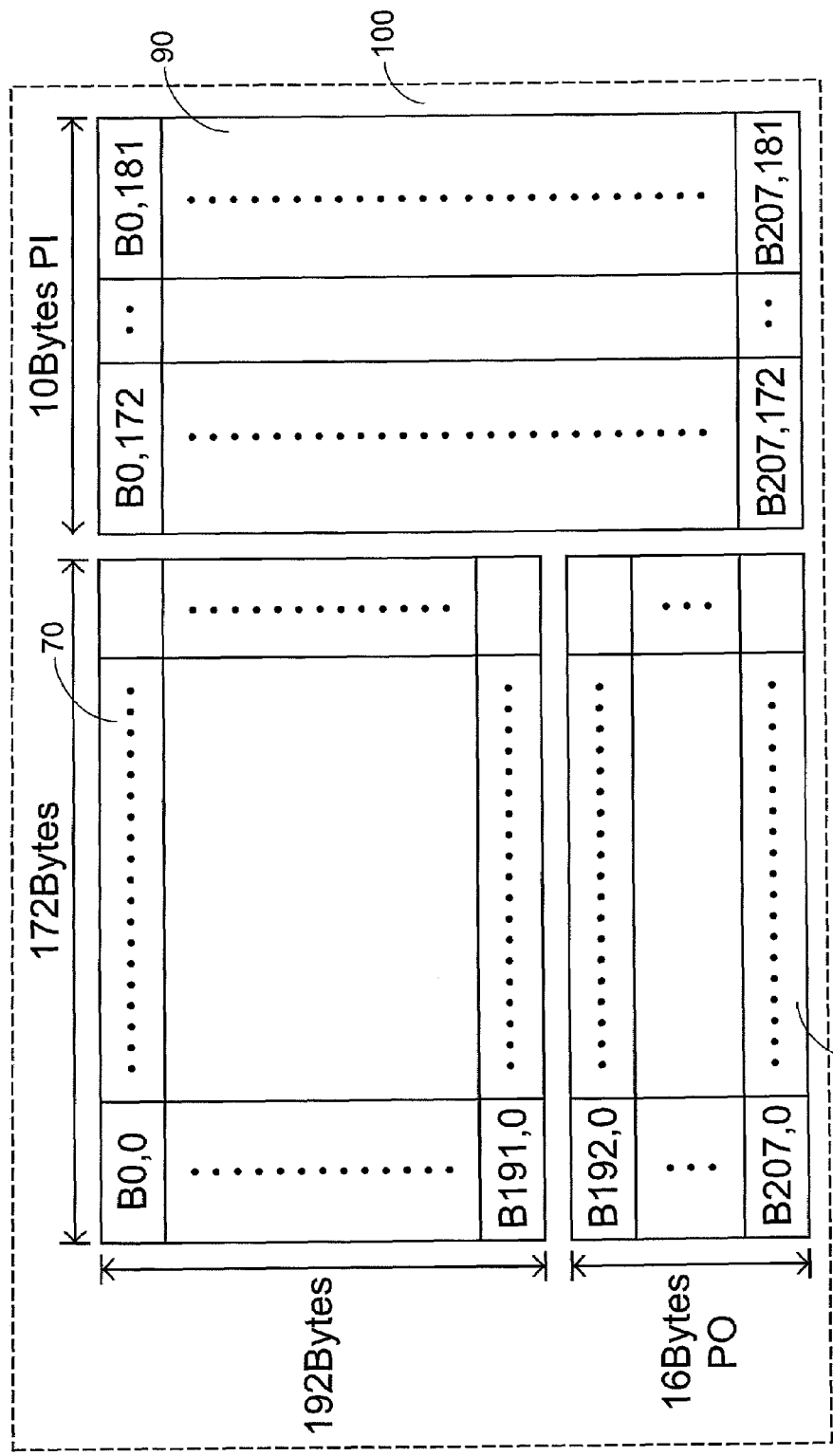
FIG. 2(b) illustrates an ECC block.
Figure 3:
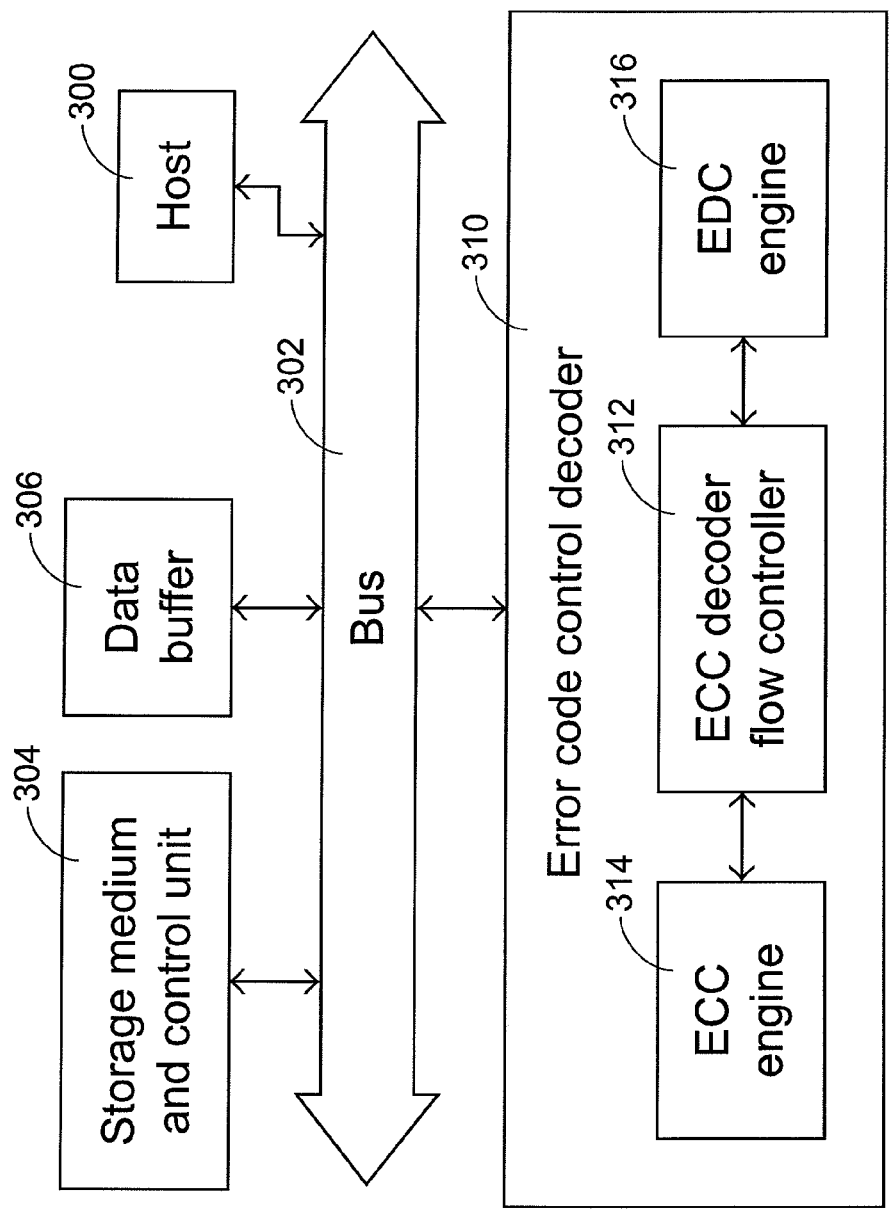
FIG. 3 is the block diagram of a known ECC control code decoding device.

The objects of the invention have been fully realized through the embodiments disclosed herein. Those skilled in the art will appreciate that the various aspects of the invention can be achieved through different embodiments without departing from the essential function. For example, the product code shown in FIG. 2(a) and FIG. 2(b) are typically employed in digital video disks (DVDs), but the present invention is equally applicable to other product code formats, including the format used in compact disks (CDs). Furthermore, the present invention could be applied to other multi-dimensional codes, not just product codes. Thus, the particular embodiments disclosed are illustrative and not meant to limit the scope of the invention as appropriately construed by the following claims.

What is claimed is:

1. An error correction method for detecting and correcting an error in an ECC (error correction code) block read from a storage medium, said ECC block including a PI (parity of inner-code) block and a PO (parity outer-code) block, the method comprising:

executing a first directional ECC decoding and a second directional ECC decoding iteratively if a retry count of one of said first directional ECC decoding and said second directional ECC decoding being less than a first threshold count, otherwise regarding as ECC failure (skipping out of the ECC method); and executing the first directional ECC decoding and the second directional ECC decoding iteratively if an un-modified count of one of said first ECC decoding and said second ECC decoding being less than a second threshold count, otherwise regarding as ECC failure (skipping out of the ECC method).

2. The method as claimed in claim 1, wherein the first directional ECC decoding comprises a PI decoding and the second directional ECC decoding comprises a PO decoding.

3. The method as claimed in claim 2, wherein the first directional ECC decoding further comprises a random error process.

4. The method as claimed in claim 2, wherein the second directional ECC decoding further comprises a random error process.

5. The method as claimed in claim 2, wherein the error correction method further comprises a step of executing an auxiliary PO decoding with marking erasure process followed after the PO decoding if a decode error or an un-correctable error read from the storage medium is detected.

6. The method as claimed in claim 2, wherein the error correction method further comprises a step of executing an auxiliary PI decoding with a marking erasure process followed after the PI decoding if a decode error or an un-correctable error is read from the storage medium is detected.

7. The method as claimed in claim 2, wherein the PI decoding can be one of a Reed-Solomon Product Code (RSPC) decoding and a Cross Interleave Reed-Solomon Code (CIRS) decoding.

8. The method as claimed in claim 2, wherein the PO decoding can be one of a Reed-Solomon Product Code (RSPC) decoding and a Cross Interleave Reed-Solomon Code (CIRS) decoding.

9. An error correction apparatus for detecting and correcting an error in an ECC (error correction code) block read from a storage medium, said ECC block including a PI (parity of inner-code) block and a PO (parity outer-code) block, the apparatus comprising:

means for executing a first directional ECC decoding and a second directional ECC decoding iteratively if a retry count of one of said first directional ECC decoding and said second directional ECC decoding being less than a first threshold count, otherwise regarding as ECC failure (skipping out of the ECC method); and means for executing the first directional ECC decoding and the second directional ECC decoding iteratively if an un-modified count of one of said first ECC decoding and said second ECC decoding being less than a second threshold count, otherwise regarding as ECC failure (skipping out of the ECC method).

10. The apparatus as claimed in claim 9, wherein the means for executing first directional ECC decoding and the second directional ECC decoding comprises a PI decoder and a PO decoder.

11. The apparatus as claimed in claim 10, wherein the PI decoder further comprises a circuit for executing a random error process.

12. The apparatus as claimed in claim 10, wherein the PO decoding further comprises a circuit for executing a random error process.

13. The apparatus as claimed in claim 10, wherein the error correction apparatus further comprises a circuit for executing an auxiliary PO decoding with marking erasure process followed after the PO decoding if a decode error or an un-correctable error read from the storage medium is detected.

14. The apparatus as claimed in claim 10, wherein the error correction apparatus further comprises a circuit for executing an auxiliary PI decoding with a marking erasure process followed after the PI decoding if a decode error or an un-correctable error is read from the storage medium is detected.

15. The apparatus as claimed in claim 10, wherein the PI decoder can be one of a Reed-Solomon Product Code (RSPC) decoder and a Cross Interleave Reed-Solomon Code (CIRS) decoder.

16. The apparatus as claimed in claim 10, wherein the PO decoder can be one of a Reed-Solomon Product Code (RSPC) decoder and a Cross Interleave Reed-Solomon Code (CIRS) decoder.

* * * * *